United States Patent
Bernard et al.

(10) Patent No.: US 6,871,444 B1
(45) Date of Patent: Mar. 29, 2005

(54) USER ACTIVATED DISPOSABLE INSECT BAIT STATION

(76) Inventors: Alan Bernard, 8885 SW. 7th St., Boca Raton, FL (US) 33488; Michael M. Anthony, 10189 W. Sample Rd., Coral Springs, FL (US) 33065

( * ) Notice: Subject to any disclaimer, the term of this patent is extended or adjusted under 35 U.S.C. 154(b) by 0 days.

(21) Appl. No.: 10/679,828

(22) Filed: Oct. 6, 2003

(51) Int. Cl.[7] ............................................. A01M 1/20
(52) U.S. Cl. ............................................. 43/131
(58) Field of Search ........................................ 43/131

(56) References Cited

U.S. PATENT DOCUMENTS

| | | | | |
|---|---|---|---|---|
| 5,396,730 A | * | 3/1995 | VanGundy et al. | 43/131 |
| 5,548,922 A | * | 8/1996 | Wefler | 43/131 |
| 5,746,019 A | * | 5/1998 | Fisher | 43/1 |
| 5,983,558 A | * | 11/1999 | Las et al. | 43/131 |
| 6,195,933 B1 | * | 3/2001 | Woodruff | 43/131 |
| 6,216,384 B1 | * | 4/2001 | Dickson et al. | 43/131 |
| D451,573 S | | 12/2001 | Clark, III | |
| 6,532,696 B2 | | 3/2003 | Clark, III | |
| 2003/0145511 A1 | * | 8/2003 | Finn et al. | 43/131 |

* cited by examiner

Primary Examiner—Kurt Rowan
(74) Attorney, Agent, or Firm—Mark D. Bowen, Esq.; Stearns Weaver Miller Weissler Alhadeff & Sitterson, P.A.

(57) ABSTRACT

A user activated, disposable insect bait station particularly adapted for use with liquid bait, including attractants and toxicants is disclosed. The bait station is formed as a sealed container fabricated from two primary parts, an upper half and a lower half sealingly connected along common peripheral edges. The bait station includes first and second internal chambers. The first internal chamber contains a liquid bait reservoir wherein all of the liquid bait is stored prior to use, and the second internal chamber is adapted to function as an entrance providing insects access to the second chamber. Manual manipulation of the bait station is required for activation whereby a frangible seal is broken placing the first and second chambers in fluid communication thereby allowing liquid bait to flow into the second chamber.

5 Claims, 7 Drawing Sheets

USER ACTIVATED DISPOSABLE INSECT BAIT STATION

CROSS REFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights.

BACKGROUND OF THE INVENTION

1. Field of the Invention

The present invention relates to devices for use in exterminating pests, and more particularly to an insect bait station that holds a liquid or granular insecticide or pesticide in a sealed configuration prior to use, but is easily opened by a user to an unsealed configuration whereby the enclosed bait is exposed to insects and other pests.

2. Description of the Background Art

Human populations have long encountered problems co-existing with various insects, particularly ants. There are more than ten thousand species of ants, a number of which infest structures, lawns, parks, and other areas frequented by humans. The various species of ants vary widely in many respects including size, color, shape, distribution, food preference, and nest locations. A particularly problematic species of ant is the fire ant. Fire ant colonies have become prevalent throughout the southeastern United States and pose a serious problem. The presence of fire ant colonies in lawns, parks, and other areas populated and/or routinely used by humans is a nuisance and a hazard due to the fire ant's painful sting, coupled with its tendency to attack in numbers. In addition, other species of ants routinely disrupt activities in homes, offices, and parks. As a result, controlling insect populations is therefore necessary.

A primary means of pest control involves the use of toxicants, particularly liquid poison. The spraying of liquid poison is a common method of pest control. Spraying liquid poison, however, involves a number of inherent disadvantages. A primary disadvantage involves the risk of exposing humans to the toxic chemical formulations. Furthermore, spraying poison is often harmful to the environment and often causes damage to vegetation and other animal species in addition to the targeted pest population. In addition, liquid poison that has been applied by spraying often degrades over time and/or is washed away by rain or irrigation water thereby reducing effectiveness and requiring repeated treatment and/or the use of greater quantities.

For these and other reasons it has been found preferable to contain liquid or gel toxicants in bait stations, which stations provide structures that contain the poison while providing access to insects.

The background art reveals a number of attempts directed to pest control. The following patents provide examples of these attempts.

| | | | |
|---|---|---|---|
| 4,648,201 | Sherman | 5,875,586 | Ballard et al. |
| 4,782,621 | Wissman | 5,943,816 | Hyatt et al. |
| 4,793,093 | Gentile | 5,943,817 | Miller |
| 4,823,506 | Demarest et al. | 5,953,854 | Hyatt |
| 4,841,669 | Demarest et al. | 5,983,558 | Las et al. |
| 5,446,992 | Stewart | 6,041,542 | Payton et al. |
| 5,501,033 | Wefler | 6,189,259 | Soller |
| 5,775,026 | Pearce et al. | 6,195,933 | Woodruff |
| 5,802,761 | Demarest et al. | 6,216,384 | Dickson et al. |
| | | 6,532,696 | Clark III, et al. |

U.S. Pat. No. 4,793,093, issued to Gentile, discloses a feeding station for vermin that allows for ingress of the vermin to feed on poisoned bait held at a central portion therein. The bait is contained within a central well and ingress is facilitated by an inclined ramp leading to the chamber. A cover is joined to the top of the base member to cover the central well holding the poisoned bait.

U.S. Pat. Nos. 4,823,506 and 4,841,669, issued to Demarest et al., each disclose an insect bait device for exterminating crawling insects. The devices comprise first and second housing portions joinable to form a housing that defines generally unobstructed entry into the device by an insect. U.S. Pat. No. 5,802,761, also issued to Demarest et al., discloses a bait station including a base defining a bait-cup and a cover fastened to the base. The cover and base cooperate to form a door and walkway to admit targeted insects to enter the bait station thus gaining access to the bait cup.

U.S. Pat. No. 5,501,033, issued to Wefler, discloses a liquid delivery bait station having two reservoirs and fluid transfer systems to allow sequential delivery of two liquids. The liquids are preferably an insect attractant that is first delivered into an absorbent feeding pad and an insect toxicant that is next delivered to the absorbent pad.

U.S. Pat. No. 5,775,026, issued to Pearce et al., discloses an insect bait station for attracting and killing insects that comprises a substantially flat configuration with insecticide formulated as a solid coating on the surface of a sheet of moisture free material, and one or more breakable ampoules containing an attractant composition. The ampoules are held in a compressible portion of the housing permitting them to be manually broken to discharge their contents on command thereby releasing attractant vapors.

U.S. Pat. No. 5,875,586, issued to Ballard et al., discloses a refillable liquid bait station formed to allow access by insects, but not by larger animals. The bait station includes a transparent housing that protects the liquid bait from wind and rain and which further prevents leakage if the bait station is tumbled and/or placed in an incorrect position by use of a series of inner walls and chambers.

U.S. Pat. No. 5,943,816, issued to Hyatt et al., discloses an insect bait station for delivering a liquid toxicant. The bait station includes a reservoir, a feeding disk with capillary feeding pores, and a base that seals the feeding pores when configured in a closed position. U.S. Pat. No. 5,953,854, also issued to Hyatt, discloses a spill resistant granular bait station having a tunnel entrance leading to an interior bridged member having an inner wall leading from the bottom surface to an inner surface having an access opening in the bridge member leading to a bait source contained within the station. A cover defines a recessed portion thereon closely cooperating with the access opening in the base.

U.S. Pat. No. 6,041,542, issued to Payton et al., discloses a spill-resistant liquid bait station for dispensing liquid bait.

The liquid bait is contained in a reservoir at the bottom of the bait station base and a lid is secured over the end of the base. The interior of the bait station is configured for containing the liquid bait if the bait station is inverted. Insects enter the bait station through one or more access ports and then travel through an interior passageway to the liquid bait.

U.S. Pat. No. 6,189,259, issued to Soller, discloses an insect bait-and-switch liquid delivery apparatus for the control of insects. The apparatus includes a reservoir defining a first chamber containing a liquid attractant and a second chamber containing a liquid toxicant. A first feeding station is provided in the first chamber and a second feeding station is provided in the second chamber. A passageway connects the first and second chambers, and an access port is disposed to initially prevent or limit access of an insect to the second feeding station during an initial feeding period and the subsequently enable access to the second feeding station via the passageway after the initial feeding period.

U.S. Pat. No. 6,195,933, issued to Woodruff, discloses a bait station for delivery of liquid insecticide formed from a base having at least one feeding station and a reservoir for storing liquid beneath the base. The insecticide is transferred by capillary action from the reservoir to the feeding station via a connecting tube.

U.S. Pat. No. 6,216,384, issued to Dickson et al., discloses an insect bait station having a continuous outer wall leading from a base to an upper annular surface having a central axial recessed opening therein leading down to a bait source contained in the interior of the station. The interior of the station defines an inverted conical concave part for concentrating the bait to the lowest point of the cone in proximity with an opening in the bottom of the central axial recessed opening.

U.S. Pat. No. 6,532,696, issued to Clark III, et al., discloses a holder for liquid insect bait comprising a sealed container having a bottom half defining contours that form reservoirs and channels wherein liquid bait may be located and flow. The device is deployed by orienting the device in a vertical configuration whereby the liquid bait flows to specified internal reservoirs, cutting an entrance opening in the container at a specified location, and placing the container in a horizontal configuration wherein the liquid bait flows to additional reservoirs accessible to the insects.

The insect bait stations of the prior art are burdened with a number of significant limitations, including the failure to disclose a liquid insect bait station that is sealed during storage, shipping, and transit, but is readily activated by the user without risk of contacting the enclosed bait during deployment.

BRIEF SUMMARY OF THE INVENTION

The present invention provides an insect bait station particularly adapted for use with liquid insecticides and pesticides. The insect bait station is fabricated as a sealed container that houses a liquid insecticide or pesticide sealed therein. The bait station is is formed as a sealed container fabricated from two primary parts, an upper half and a lower half sealingly connected along common peripheral edges. The lower half is generally planar and provides a flat bottom surface or base for orienting the bait station on a horizontal supporting surface. The upper half defines a surface forming a generally conical shape with a truncated top. More particularly, the upper half defines radially inner and outer conical projecting surfaces arranged in a concentric configuration. The outer conical surface defines an interior volume that functions as a liquid bait reservoir wherein all of the liquid bait is stored prior to use. The inner conical surface defines an interior volume that partially fills with liquid bait upon activation and deployment of the device so as to form a bait filled chamber having a generally axially disposed entrance. Specifically, the seal between the inner and outer conical structures is manually broken by the user by manual manipulation of the inner conical surface which functions to break the annular seal separating the base of the inner conical structure from the surrounding outer conical reservoir.

Accordingly, it is an object of the present invention to provide an improved insect bait station.

Still another object of the present invention is to provide a spill resistant liquid insect bait station.

Another object of the present invention is to provide a liquid insect bait station wherein liquid bait is maintained in a sealed reservoir prior to use, and allowed to flow into a secondary reservoir upon deployment.

Still further objects and advantages will become apparent from a consideration of the ensuing description and drawings.

DETAILED DESCRIPTION OF THE INVENTION

Figure 1:
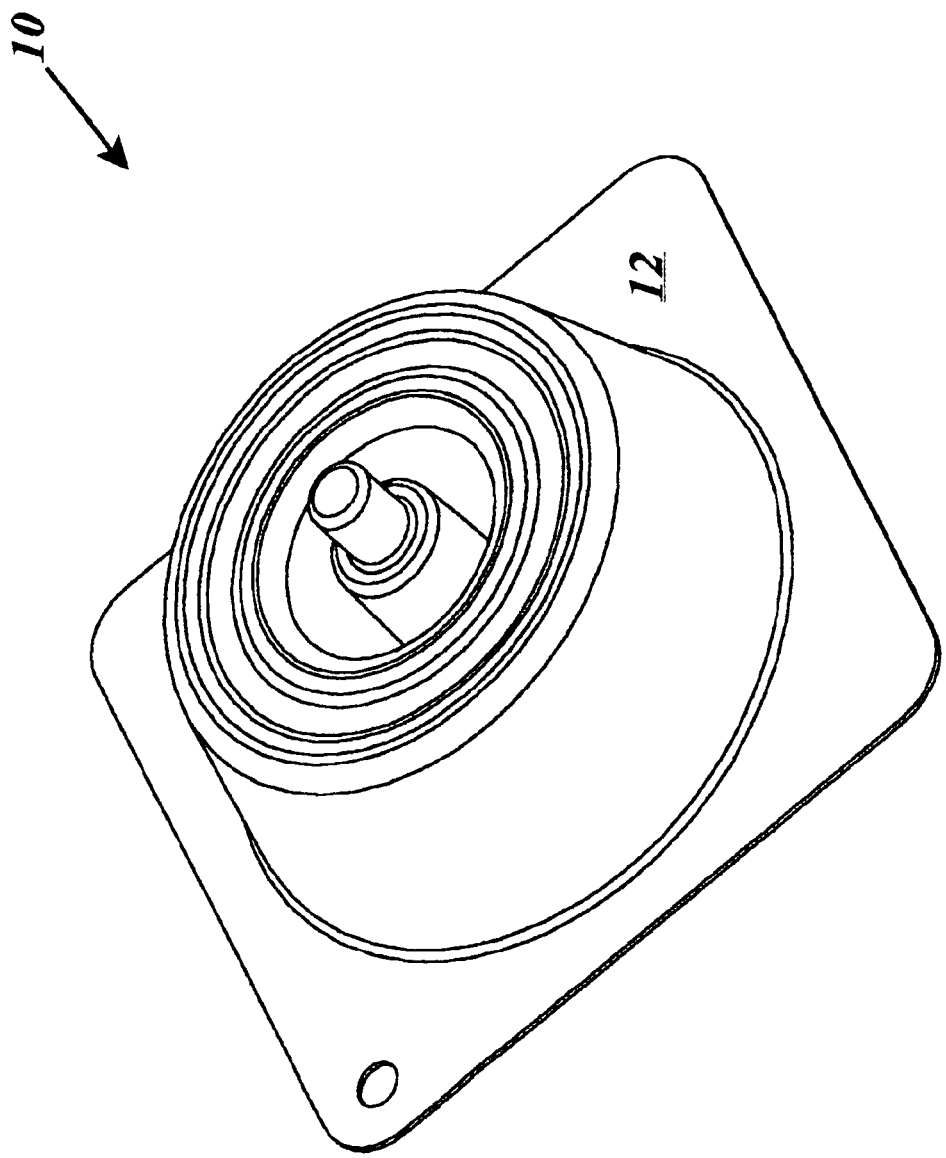
FIG. 1 is a top perspective view of an upper half of an insect bait station according to the present invention.
Figure 2:
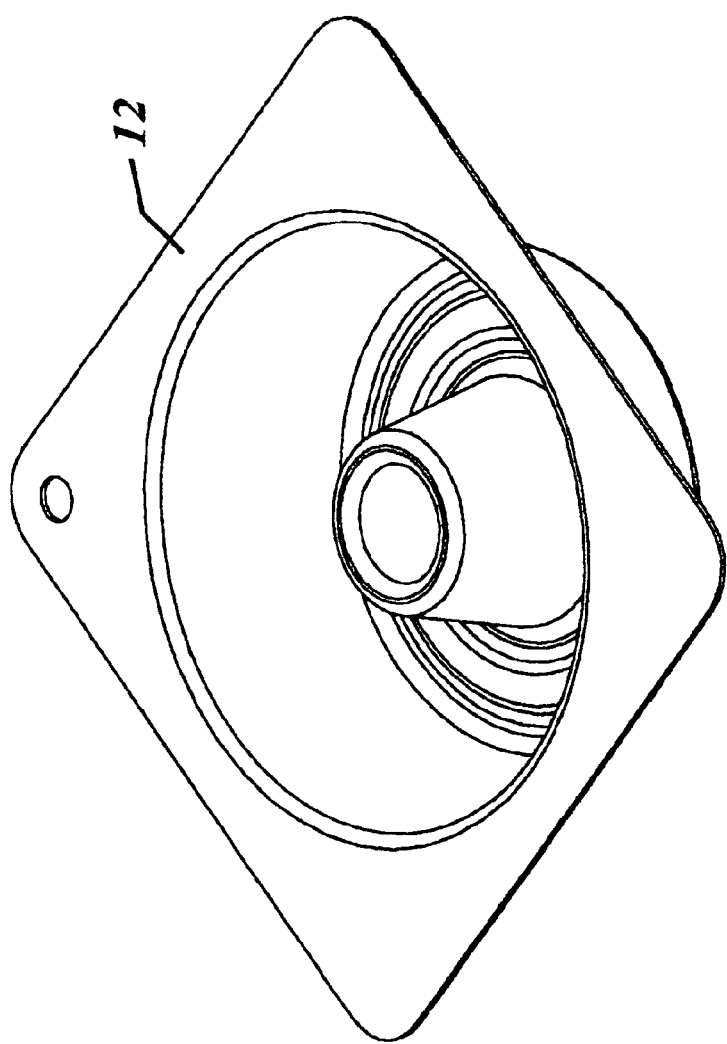
FIG. 2 is bottom perspective view thereof.
Figure 3:
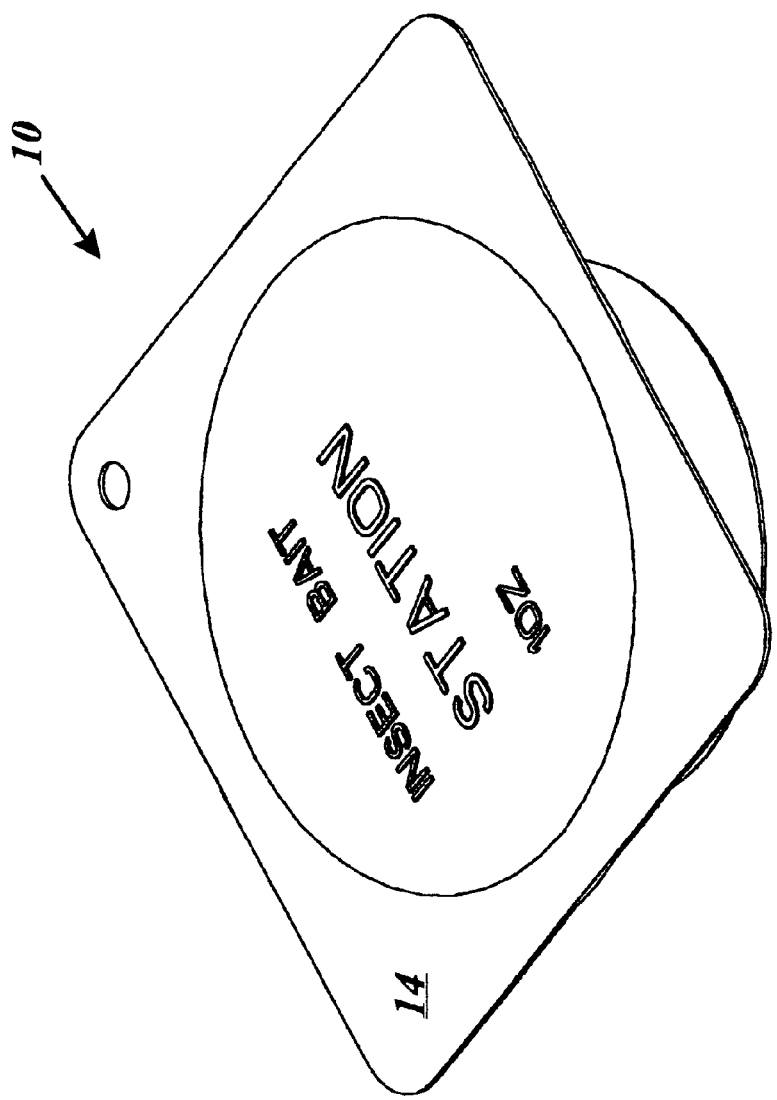
FIG. 3 is a bottom perspective view of the bait station with the lower half affixed to the upper half.
Figure 4:
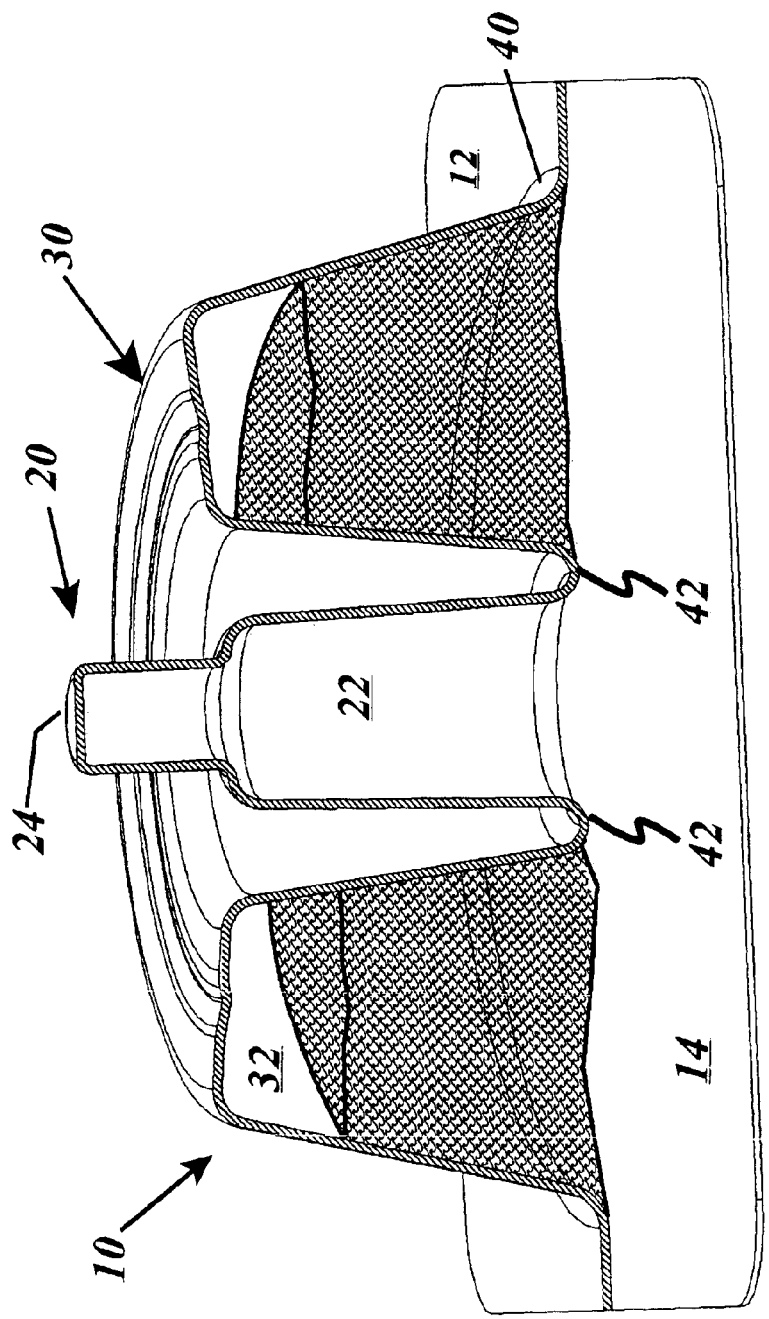
FIG. 4 is a side perspective view with the upper half partially cutaway.
Figure 5:
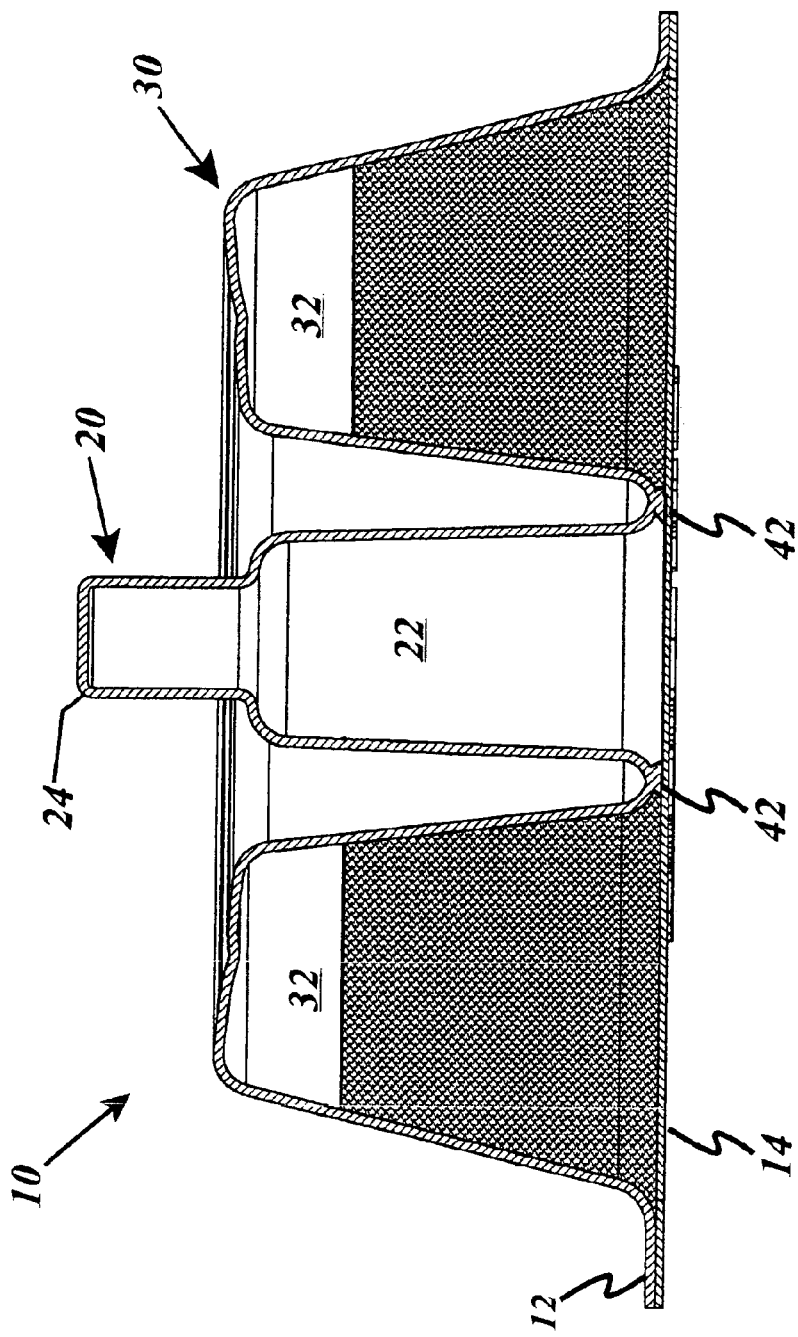
FIG. 5 is a side sectional view thereof.

With reference now to the drawings FIGS. 1–7 depict an insect bait station, generally referenced as 10, particularly adapted for use with liquid insecticides and pesticides. Insect bait station 10 is preferably fabricated from vacuum formed plastic, but any suitable material is considered within the scope of the present invention. Insect bait station 10 is formed as a sealed container fabricated from two primary parts, an upper half 12 and a lower half 14 sealingly connected along common peripheral edges to form a unitary structure. Lower half 14 is generally planar and provides a flat bottom surface or base for orienting the bait station on a horizontal supporting surface as seen in FIGS. 4 and 5. Upper half 12 defines a surface forming a generally raised annular shape, such as a conical shape with a truncated top. More particularly, the upper half 12 defines concentrically disposed projecting surfaces, including a projecting inner conical structure 20 and a projecting doughnut-shaped or annular outer structure 30 in surrounding relation therewith. As depicted in FIG. 5 the inner conical and outer annular structures are generally axially aligned, with the inner conical structure having a portion thereof projecting beyond the upper edge of the outer annular structure for reasons more fully discussed herein below.

Outer annular surface 30 defines an interior volume 32 that functions as a liquid bait reservoir chamber wherein all of the liquid bait is stored prior to use. Bait reservoir 32 is bounded on the bottom by lower half 14 and along the top and sides thereof by projecting surface 30, which forms an inverted U-shaped cross-section having circumferential inner and outer walls and a top as depicted in FIG. 5. Bait reservoir 32 functions to contain a liquid insecticide or pesticide prior to use as best depicted in FIGS. 4 and 5.

Generally concentric annular seals, referenced as 40 and 42, are formed between upper half 12 and lower half 14 thereby forming a watertight reservoir chamber referenced as 32. Seal 42 is fabricated to be a frangible seal that may be manually breached or broken by the user prior to use as more fully discussed herein. As best depicted in FIG. 5, seals 40 and 42 may be formed by thermal and/or sonic welding so as to join said portions of upper half 12 and lower half 14 thereby providing a seal or barrier. It should be noted that seal 40 may extend from the lower peripheral edge of outer annular structure 30 to the peripheral edge of the upper and lower halves 12 and 14.

Inner conical structure 20 is generally concentrically disposed relative to outer annular structure 30 and includes a lower edge thereof forming a part of seal 42 as clearly depicted in FIG. 4. Inner conical structure 20 defines an internal volume 22 that is initially void of any insecticide or pesticide, however, when activated for use internal volume 22 functions as a second internal chamber capable of functioning as a liquid reservoir. More particularly, inner conical structure 20 includes a lower circumferential edge portion thereof cooperating with a coextensive lower circumferential edge portion of outer annular structure 30 to form seal 42 thereby preventing the liquid insecticide and/or pesticide maintained in reservoir 32 of outer annular structure 30 from entering internal volume 22 of inner conical structure 20 as depicted in FIGS. 4 and 5. Inner conical structure 20 further includes an upper portion thereof, referenced as 24, that projects upward beyond the upper extreme of outer annular structure 30. Conical structure 20 is preferably under deformation stress when sealed, so as to be biased upward and away from lower half 14 when seal 42 is broken thereby placing internal volume 22 in fluid communication with internal reservoir 32 such that liquid is allowed to reach an equilibrium level by flowing from reservoir 32 into internal volume 22. More particularly, conical structure 20 is forced downward such that the lower edge thereof comes into contact with lower half 14 during the fabrication process that results in the formation of a frangible heat seal 42. When seal 42 is broken, the resilient characteristics of the material forming the body of bait station 10 and particularly the common wall that defines chamber 30 bias structure 20 upward such that a gap is formed between the lower portion of structure 20 and lower half 14.

An insect bait station according to the present invention may be fabricated by vacuum or injection molding, or any other suitable manufacturing technique. In a preferred embodiment, upper half 12 is fabricated by vacuum molding using a suitable plastic or resin. Upper half 12 is then inverted and reservoir 32 is filled with a liquid insecticide and/or pesticide with care being taken to avoid having any of the liquid enter into volume 22 defined by inner conical structure 20. Next, while maintaining upper half 12 inverted, lower half 14 is placed in mating engagement therewith and seals 40 and 42 are formed using heat or sonic welding techniques. As should be apparent, the disclosed configuration maintains the liquid bait within annular volume 32 defined by raised annular structure 30 during post manufacturing packaging, storage, and shipping.

Figure 6:
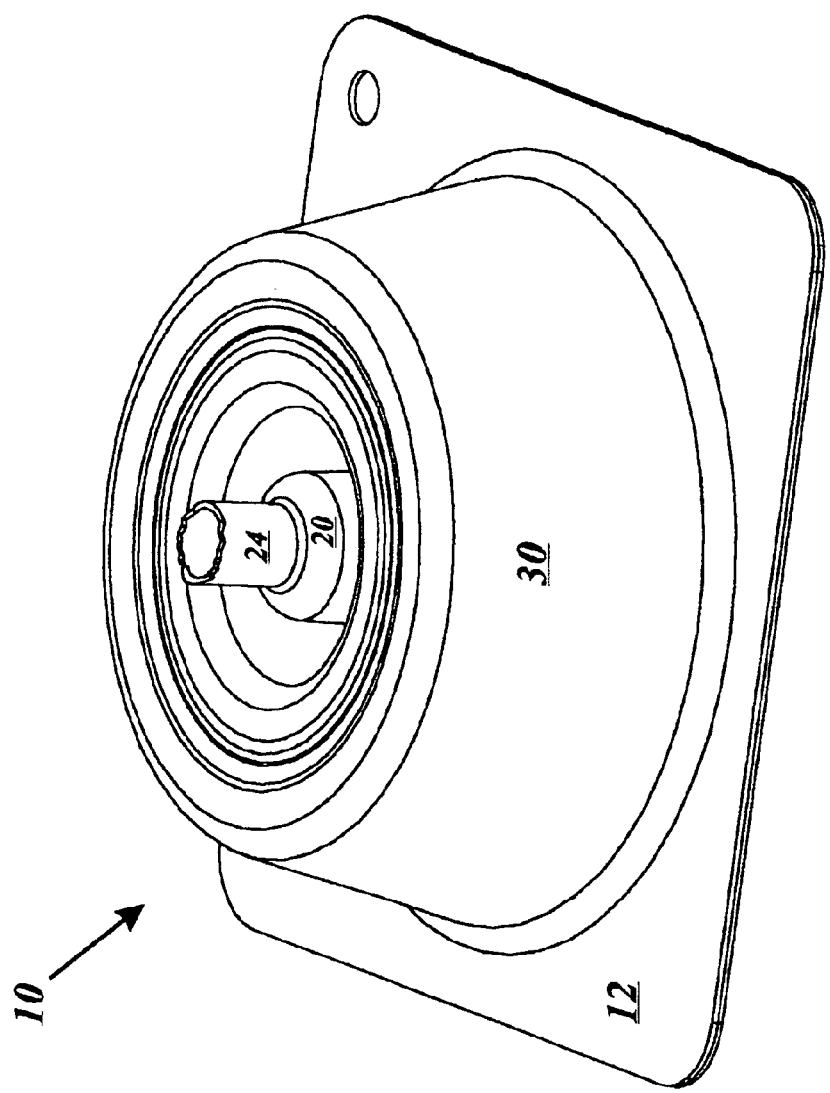
FIG. 6 is a top perspective view thereof with the top of the inner conical surface cut-off.
Figure 7:
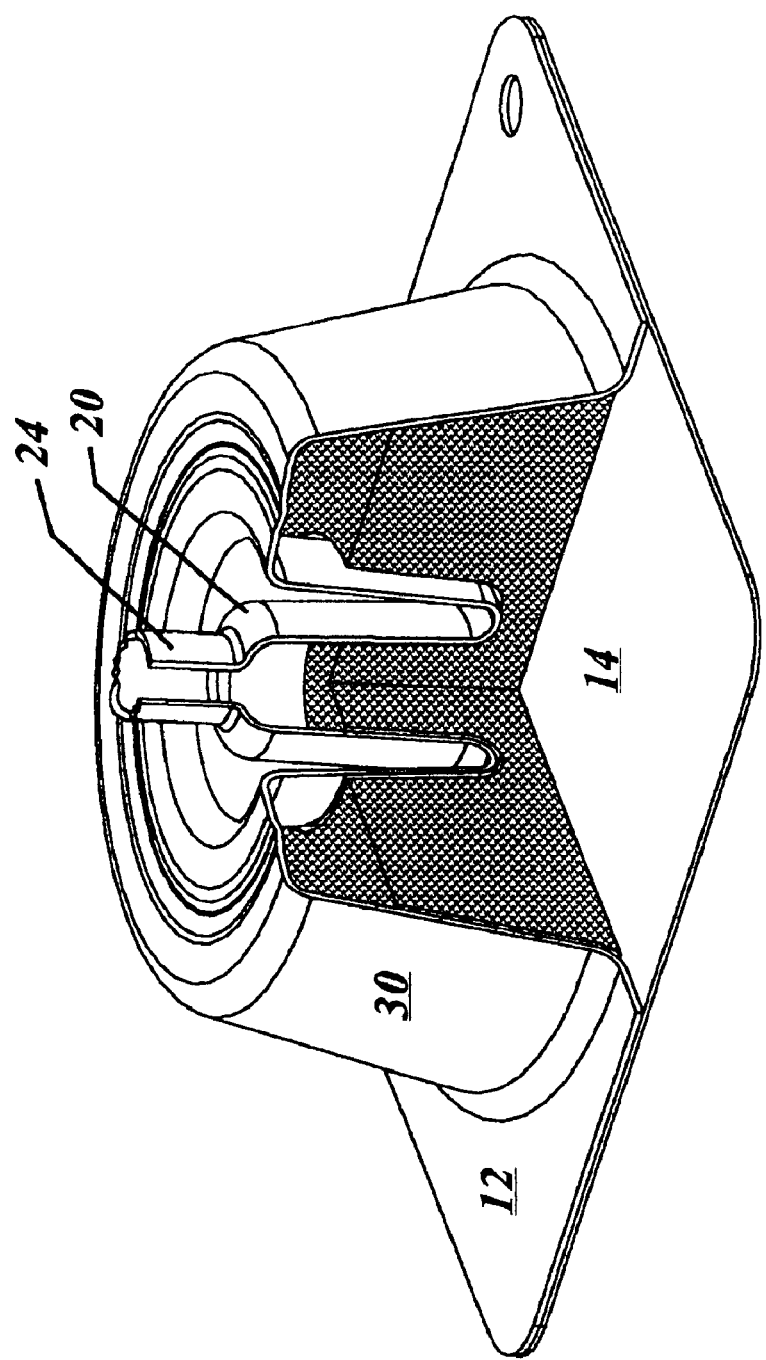
FIG. 7 is a side perspective view with a quarter section cut-away.

Once the user desires to deploy insect bait station for use, the user activates the device by first cutting off the top portion 24 of conical structure 20 using scissors such that internal volume 22 is in communication with the surrounding atmosphere as best depicted in FIG. 6. In an alternate embodiment, top portion 24 may be simply torn off by the user. Next seal 42 is broken when the user grasps the upper portion 24 of conical structure 20 and manipulates the structure so as to break the seal. Once seal 42 is broken, deformation stress biases conical structure 20 upward thereby allowing liquid insecticide to flow from reservoir 32 into the internal volume 22 of structure 20 until the liquid level in volume 22 reaches equilibrium with the liquid level in reservoir 30. The configuration disclosed maximizes the effective life of the bait station by minimizing loss of liquid bait due to evaporation since the opening is structure 20 is relatively small. As should now be apparent, the opening created in the top portion 24 of conical structure 20 functions as an entrance allowing insects access to the enclosed bait. Bait station is preferably disposed on a horizontal supporting surface, but may be fixed to a vertical surface such as a wall by hanging the device on a nail or other projecting structure using an aperture, referenced as 50 located in the base. Bait station 10 may be discarded when its effective life has been reached.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

We claim:

1. A user activated, disposable insect bait station comprising:

a bait station body including a base, first and second internal chambers, and a frangible seal separating said first and second chambers;

said first chamber defined by said base, radially spaced inner and outer annular walls, and a top;

said second chamber defined by a generally cylindrical wall axially disposed relative to said first chamber;

said second chamber cylindrical wall and said first chamber inner annular wall each having connected lower edge portions, said connected lower edge portions connected to said frangible seal;

said container manually configurable from an inactivated configuration wherein said first chamber contains a liquid insecticide bait and said second chamber is generally void of liquid insecticide, to an activated configuration wherein said frangible seal is broken thereby placing said first chamber in fluid communication with said second chamber such that liquid insecticide is allowed to flow from said first chamber into said second chamber;

said bait station body including means for forming an opening into which insects attain access to the liquid insecticide in said second chamber.

2. A user activated, disposable insect bait station according to claim 1 wherein said means for forming an opening comprises a permanent opening in said bait station body leading to said second chamber.

3. A user activated, disposable insect bait station according to claim 1 wherein said means for forming an opening includes a projecting portion of said bait station body designed to be cut away by the user thereby forming an opening leading to said second chamber.

4. A user activated, disposable insect bait station comprising:

a bait station body having an upper half and a generally planar lower half, each half including a peripheral edge, said upper half and lower half peripheral edges in fluid tight sealing engagement;

said bait station body including first and second internal chambers, and a frangible fluid tight seal separating said first and second chambers;

said first chamber having liquid insecticide bait therein;

said first chamber disposed in annular surrounding relation with said second chamber;

said bait station manually configurable from an inactivated configuration wherein said liquid insecticide is maintained in said first chamber with said second chamber remaining generally void of liquid insecticide, to an activated configuration wherein said frangible seal is broken thereby placing said first chamber in fluid communication with said second chamber such that liquid insecticide is allowed to flow from said first chamber into said second chamber;

said bait station body adapted to form an opening into which insects attain access to the liquid insecticide in said second chamber.

5. A user activated, disposable insect bait station comprising:

a bait station body including a base, first and second internal chambers, and a frangible seal separating said first and second chambers;

said first chamber is defined by radially spaced annular walls projecting upward from said base, and a top;

said second chamber is defined by a generally cylindrical wall axially disposed relative to said first chamber and projecting upward from said base;

said body manually configurable from an inactivated configuration wherein said first chamber contains a liquid insecticide and said second chamber is generally void of liquid insecticide, to an activated configuration wherein said frangible seal is broken thereby placing said first chamber in fluid communication with said second chamber such that liquid insecticide is allowed to flow from said first chamber into said second chamber;

said bait station body adapted to form an opening into which insects attain access to the liquid insecticide in said second chamber.

* * * * *